United States Patent
Ashoori et al.

(10) Patent No.: US 10,665,066 B2
(45) Date of Patent: *May 26, 2020

(54) WEARER ROLE-BASED VISUALLY MODIFIABLE GARMENT

(71) Applicant: International Business Machines Corporation, Armonk, NY (US)

(72) Inventors: Maryam Ashoori, White Plains, NY (US); James R. Kozloski, New Fairfield, CT (US); Clifford A. Pickover, Yorktown Heights, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/007,226

(22) Filed: Jun. 13, 2018

(65) Prior Publication Data
US 2018/0293851 A1    Oct. 11, 2018

Related U.S. Application Data

(63) Continuation of application No. 15/800,163, filed on Nov. 1, 2017, now Pat. No. 10,043,353, which is a
(Continued)

(51) Int. Cl.
*G08B 3/00* (2006.01)
*G08B 5/36* (2006.01)
(Continued)

(52) U.S. Cl.
CPC ............... *G08B 5/36* (2013.01); *A41D 1/002* (2013.01); *G06F 1/163* (2013.01); *G06F 3/011* (2013.01);
(Continued)

(58) Field of Classification Search
CPC ... G08B 5/36; G06F 1/163; G06F 3/14; G06F 3/011; G06F 3/16; A41D 1/002;
(Continued)

(56) References Cited

U.S. PATENT DOCUMENTS 6,217,188 B1    4/2001  Wainwright et al.
8,214,214 B2    7/2012  Bennett
(Continued)

FOREIGN PATENT DOCUMENTS

CN    202504255    10/2012
CN    202842374     4/2013
(Continued)

OTHER PUBLICATIONS

International Searching Authority, International Search Report and Written Opinion for PCT/EP2016/053602, dated Jul. 12, 2016.
(Continued)

*Primary Examiner* — Anh V La
(74) *Attorney, Agent, or Firm* — Law Office of Jim Boice (57) ABSTRACT

A system includes, but is not limited to, a hardware controller for adjusting a dynamically modifiable display on a garment; and an environmental dominant hue sensor that detects a real-time dominant hue of an environment in which the garment is located, where the hardware controller adjusts the dynamically modifiable display based on a real-time detected dominant hue of the environment in which the garment is located in order to increase a color contrast between the dynamically modifiable display and the real-time detected dominant hue of the environment in which the garment is located.

20 Claims, 5 Drawing Sheets

Related U.S. Application Data continuation of application No. 14/635,665, filed on Mar. 2, 2015, now Pat. No. 9,836,927.

(51) Int. Cl.

| | | |
|---|---|---|
| *G06F 3/14* | (2006.01) | |
| *G06F 1/16* | (2006.01) | |
| *G06F 3/01* | (2006.01) | |
| *A41D 1/00* | (2018.01) | |
| *H04W 4/50* | (2018.01) | |
| *H04W 4/02* | (2018.01) | |
| *G06F 3/16* | (2006.01) | |

(52) U.S. Cl.
CPC .............. *G06F 3/14* (2013.01); *G06F 3/16* (2013.01); *G09G 2380/02* (2013.01); *G09G 2380/06* (2013.01); *H04W 4/025* (2013.01); *H04W 4/50* (2018.02)

(58) Field of Classification Search
CPC .... H04W 4/50; H04W 4/025; G09G 2380/06; G09G 2380/02
USPC ........ 340/691.6, 693.5, 693.9, 691.1; 345/7; 2/69; 362/606, 103; 482/1; 600/300, 600/388
See application file for complete search history.

(56) References Cited

U.S. PATENT DOCUMENTS

| | | | |
|---|---|---|---|
| 9,836,927 B2 | 12/2017 | Ashoori | |
| 10,043,353 B2 * | 8/2018 | Ashoori | A41D 1/002 |
| 2001/0043164 A1 * | 11/2001 | Thagard | A41D 27/085 |
| | | | 345/7 |
| 2003/0213045 A1 | 11/2003 | Fuentes | |
| 2005/0001720 A1 | 1/2005 | Mason et al. | |
| 2008/0125288 A1 | 5/2008 | Case | |
| 2010/0234714 A1 | 9/2010 | Mercier et al. | |
| 2010/0313325 A1 | 12/2010 | Ebejer | |
| 2011/0083247 A1 | 4/2011 | Farah | |
| 2012/0204310 A1 | 8/2012 | Fernandez | |
| 2012/0306836 A1 | 12/2012 | Ackerman | |
| 2014/0053315 A1 * | 2/2014 | Pond | A41D 1/002 |
| | | | 2/144 |
| 2014/0082822 A1 | 3/2014 | Rober et al. | |
| 2014/0340877 A1 | 11/2014 | Nelson | |
| 2015/0029746 A1 | 1/2015 | Campbell | |
| 2015/0161858 A1 | 6/2015 | Fu et al. | |
| 2015/0227164 A1 * | 8/2015 | Laycock | G06F 1/163 |
| | | | 345/82 |

FOREIGN PATENT DOCUMENTS

| | | |
|---|---|---|
| DE | 202014102990 U1 | 2/2015 |
| WO | 2008020376 A2 | 2/2008 |

OTHER PUBLICATIONS

P. Mell et al., "The NIST Definition of Cloud Computing", National Institute of Standards and Technology, Information Technology Laboratory, Sep. 2011, pp. 1-7.

J. Carafano, "Preparing Responders to Respond: The Challenges to Emergency Preparedness in the 21st Century", The Heritage Foundation, Heritage Lectures, No. 812, Oct. 22, 2003, pp. 1-7.

San Diego County News Center, "Conference Addresses Challenges in Emergency Management", San Diego County News Center, countynewscenter.com, Aug. 22, 2012, pp. 1-2.

C. Gares, "Challenges in Emergency Management", Edublogs, cgares.edublogs.org, Jan. 28, 2013, pp. 1-3.

World Confederation for Physical Therapy, "What is disaster management?" World Confederation for Physical Therapy, wcpt.org, retrieved Mar. 2, 2015, pp. 1-4.

List of IBM Patents or Patent Applications Treated as Related. Jun. 12, 2018.

U.S. Appl. No. 14/635,665 Final Office Action dated Apr. 12, 2017.

U.S. Appl. No. 14/635,665 Non-Final Office Action dated Jul. 1, 2016.

* cited by examiner

WEARER ROLE-BASED VISUALLY MODIFIABLE GARMENT

BACKGROUND

The present disclosure relates to the field of garments, and specifically to garments that are able to change their appearance. More specifically, the present disclosure related to garments that change their appearance based on the role of the wearer of the garment.

There are four main types of disasters.

Natural disasters include floods, hurricanes, earthquakes and volcano eruptions that have immediate impacts on human health and secondary impacts causing further suffering from (for example) floods, landslides, fires, tsunamis.

Environmental emergencies include technological or industrial accidents, usually involving the production, use or transportation of hazardous material, and occur where these materials are produced, used or transported, and forest fires caused by humans.

Complex emergencies involve a break-down of authority, looting and attacks on strategic installations, including conflict situations and war.

Pandemic emergencies involve a sudden onset of contagious disease that affects health, disrupts services and businesses, and brings economic and social costs.

Any disaster can interrupt essential services, such as health care, electricity, water, sewage/garbage removal, transportation and communications.

All such types of disasters often create chaotic environments, in which the interplay between injured persons and/or damaged property with emergency responders (e.g., police, fire fighters, emergency health care providers) is confusing. That is, coordinating emergency responders within such chaotic environments is difficult, since it is often difficult to even know who needs help, what the state/role of each person is (whether a victim of or responder to the disaster), etc.

SUMMARY

In an embodiment of the present invention, a system includes, but is not limited to, a hardware controller for adjusting a dynamically modifiable display on a garment; and an environmental dominant hue sensor that detects a real-time dominant hue of an environment in which the garment is located, where the hardware controller adjusts the dynamically modifiable display based on a real-time detected dominant hue of the environment in which the garment is located in order to increase a color contrast between the dynamically modifiable display and the real-time detected dominant hue of the environment in which the garment is located.

In an embodiment of the present invention, a method adjusts a visual appearance of a garment. An environmental dominant hue sensor detects a real-time dominant hue of an environment in which a garment is located. A hardware controller adjusts a dynamically modifiable display on the garment based on the dominant hue of the environment in which the garment is located, where the hardware controller adjusts the dynamically modifiable display based on a real-time detected dominant hue of the environment in which the garment is located in order to increase a color contrast between the dynamically modifiable display and the real-time detected dominant hue of the environment in which the garment is located.

In an embodiment of the present invention, a computer program product adjusts a dynamically modifiable display on a garment. The computer program product includes a non-transitory computer readable storage medium having program code embodied therewith, where the non-transitory computer readable storage medium is a tangible medium. The program code is readable and executable by a processor to perform a method of: detecting, by an environmental dominant hue sensor, a real-time dominant hue of an environment in which a garment is located, and adjusting, by a hardware controller, a dynamically modifiable display on the garment based on the dominant hue of the environment in which the garment is located, where the hardware controller adjusts the dynamically modifiable display based on a real-time detected dominant hue of the environment in which the garment is located in order to increase a color contrast between the dynamically modifiable display and the real-time detected dominant hue of the environment in which the garment is located.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
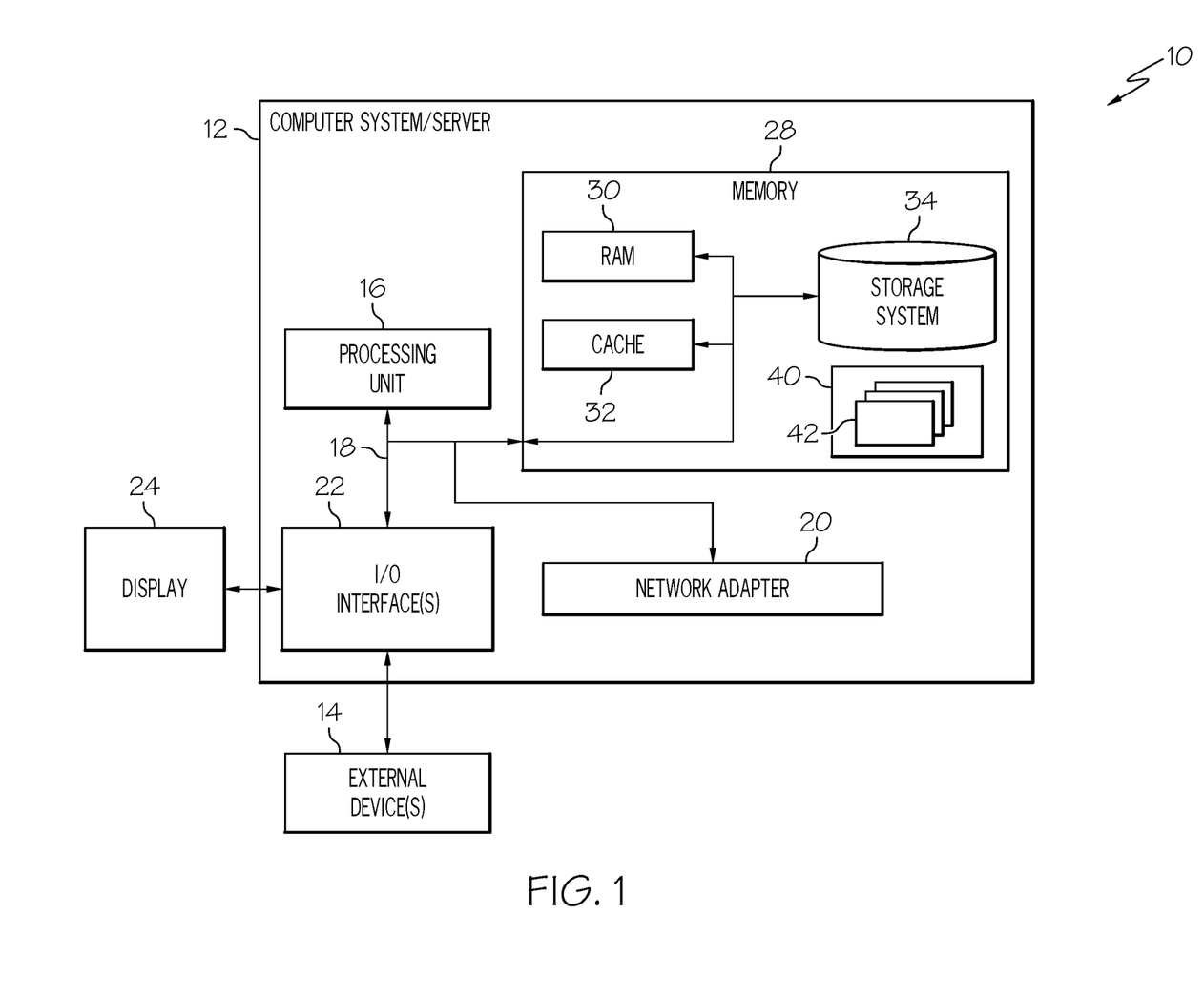
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
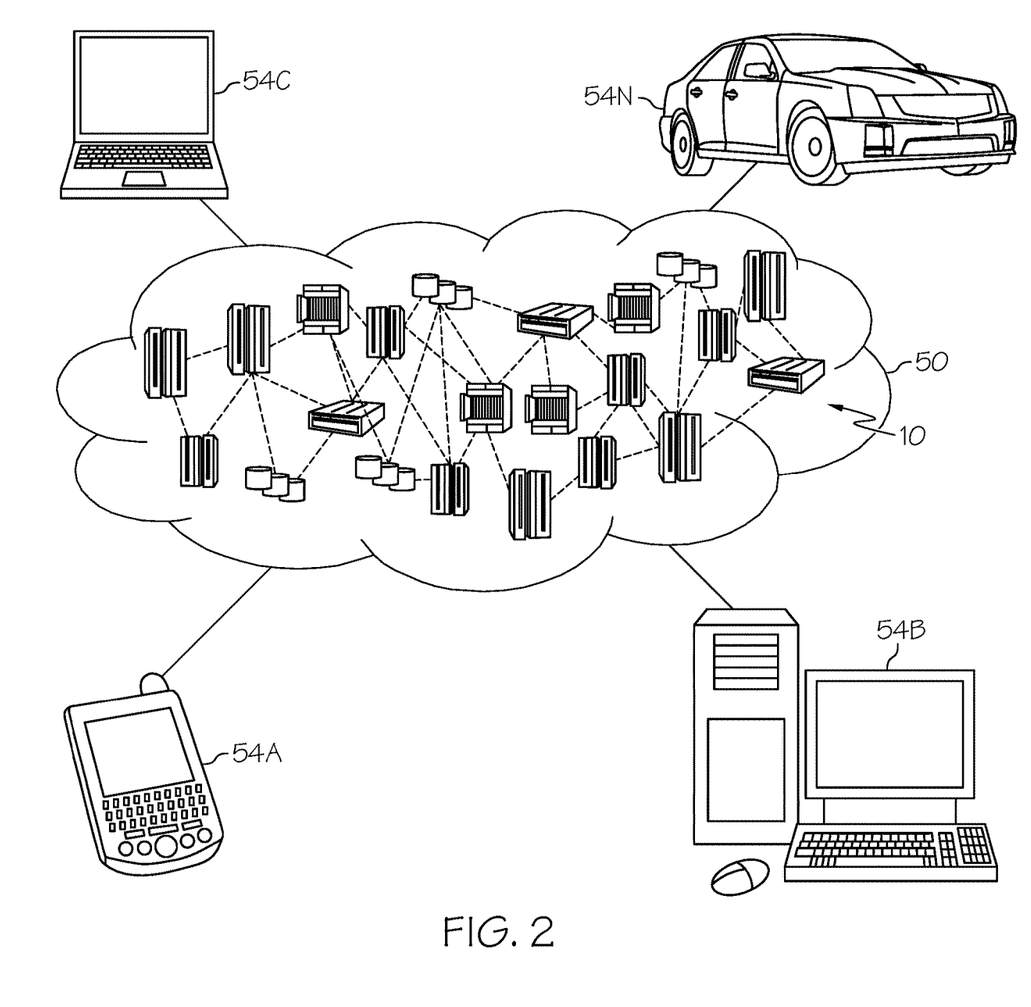
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
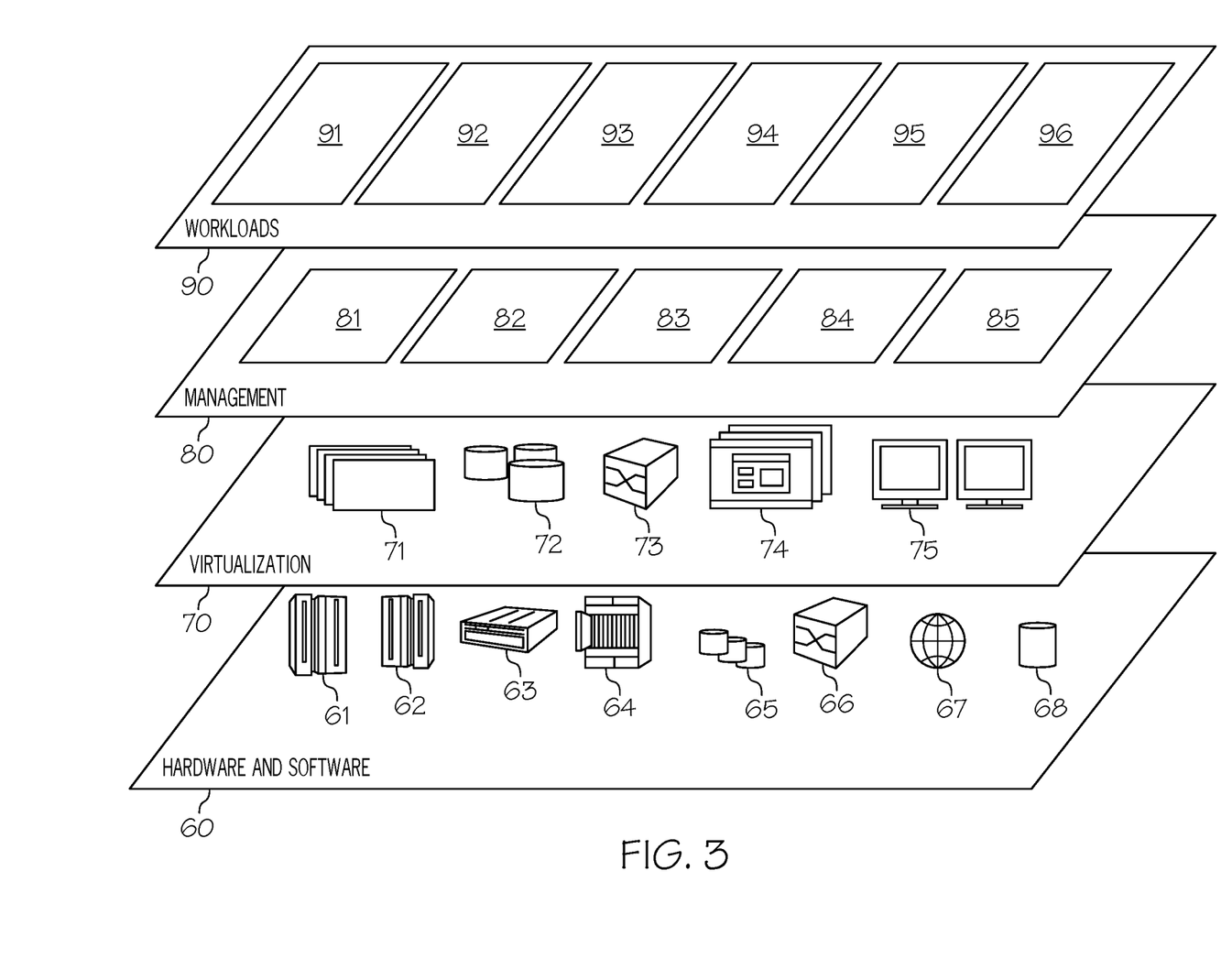
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and clothing modification processing 96.

Figure 4:
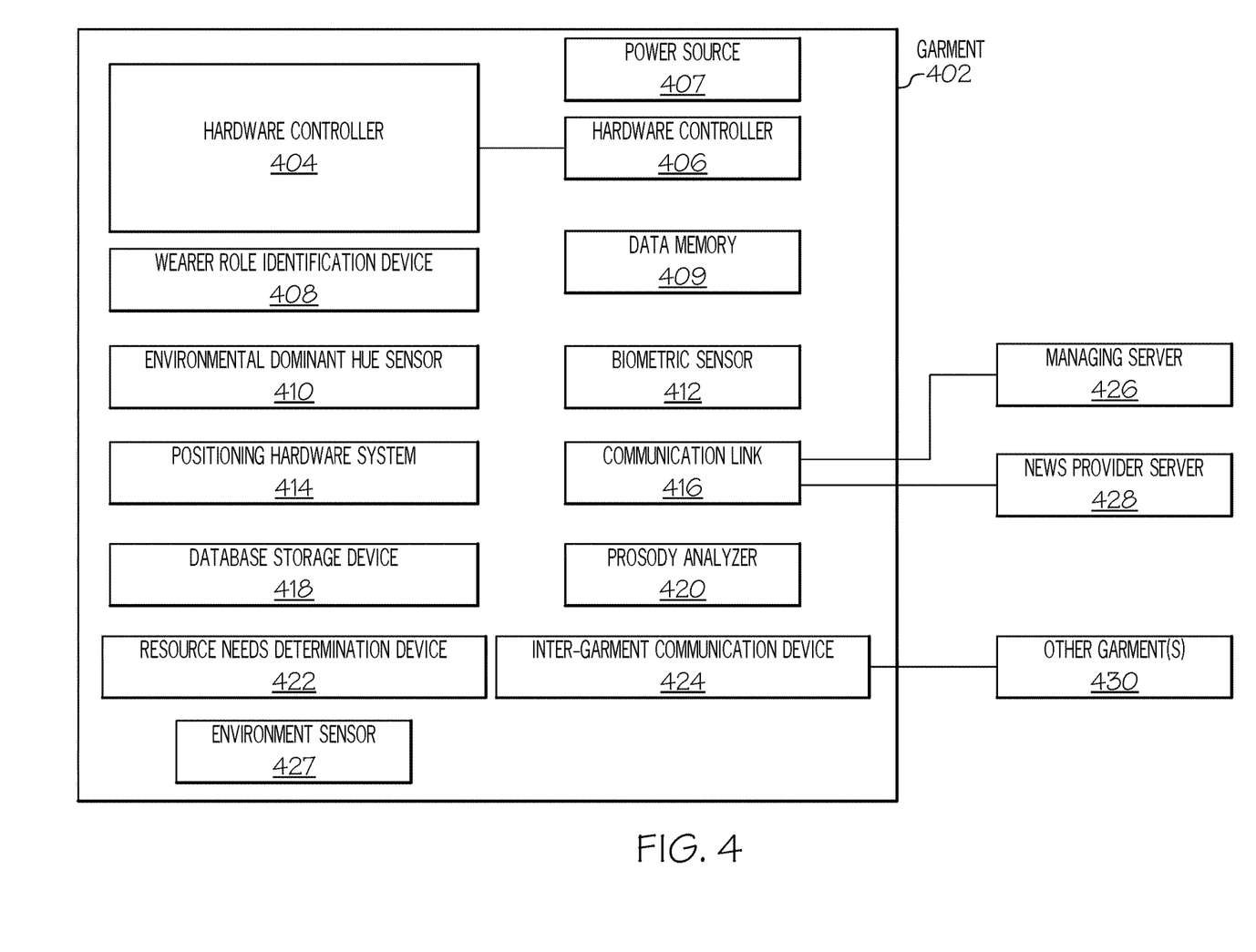
FIG. 4 illustrates an exemplary system in which the present invention may be utilized.

With reference now to FIG. 4, an exemplary system in which the present invention may be utilized is presented.

As shown in FIG. 4, a garment 402 is worn by a wearer (not shown). For exemplary purposes, assume that the wearer is located at a disaster site. While the wearer may be a victim of the disaster, further assume for explanatory purposes that the wearer is a responder to the disaster (i.e., one who provides policy, fire, medical assistance to victims of the disaster).

Garment 402 may be any object that is wearable. Examples of garment 402 include, but are not limited to, a shirt, a coat, a backpack, a shoe, a sock, a jacket, a purse, an umbrella, a vest, etc.

As shown in FIG. 4, garment 402 includes a dynamically modifiable display 404, which is applied to, covers, and/or is integrated into garment 402. For example, assume that garment 402 includes fibers made of Organic Light Emitting Diodes (OLEDs), which are light-emissive electroluminescent layers of organic compounds that emit light when an electric current is applied. Such organic compounds are typically situated between two electrodes, which selectively apply current through the OLED, thus changing the OLED from a transparent state to a visible light emitting state. Thus, when woven into the fabric of the garment 402 as fiber-optic threads, the presence of the OLED is not visually apparent until activated by electrical current from a controller such at the hardware controller 406 shown in FIG. 4.

While the hardware controller 406 may be a full function microprocessor, in a preferred embodiment hardware controller 406 is a microcontroller that has access to a power source 407 (e.g., a battery) and basic circuitry for selectively sending power to the dynamically modifiable display 404, thereby selectively illuminating all or portions of the dynamically modifiable display 404.

In another embodiment, the dynamically modifiable display 404 is an array of Light Emitting Diodes (LEDs), which are controllable by the hardware controller 406 to generate a particular pattern (e.g., a flashing light, a red cross indicating a need for medical assistance, etc.) or other light patterns (e.g., uniform illumination of the LEDs).

In one embodiment of the present invention, the hardware controller 406 also contains and/or has access to a data memory 409, which is a non-volatile memory that stores information about a role of the wearer of the garment 402, an identity of the wearer of the garment 402, display information about the dynamically modifiable display 404 (i.e., data that controls how current is selectively applied to various areas on the dynamically modifiable display 404), information about the environment in which the garment 402 is located, etc.

In an embodiment in which the data memory 409 stores information about the role of the wearer of the garment 402, such data may come from a wearer role identification device 408, which identifies a role of a wearer of a garment. In various embodiments of the present invention, the role of the wearer is dynamically changeable.

For example, assume that a first responder (e.g., a responder to a disaster site) is qualified as a firefighter, a paramedic, and a Hazardous Materials (HAZMAT) responder. Initially, the wearer role identification device 408 may generate a default message identifying the wearer of the garment 402 as a firefighter (based on default wearer identification data stored in data memory 409), which is the role that the wearer is initially taking on upon arriving at the disaster site. However, if there is no fire to fight (i.e., if there never was a fire or the fire has been put out), then the wearer of the garment 402 may now be available as either a paramedic or a HAZMAT responder (assuming he/she is so qualified/certified/licensed). The user can enter (using a voice command to a voice recognition system that is part of the wearer role identification device 408, clicking a button/switch on the wearer role identification device 408, etc.) an input indicating that he/she is now available to act as a paramedic or a HAZMAT responder. This input causes the hardware controller 406 to change the appearance of the dynamically modifiable display 404.

For example, assume that the dynamically modifiable display 404 is a panel of OLEDs that are woven into the fabric of the garment 402. The hardware controller 406 can change the visual appearance of the dynamically modifiable display 404 (and thus the garment 402) from orange (which identifies firefighters) to red (which identifies paramedics) or blue (which identifies HAZMAT responders). Thus, other first responders and/or victims at the disaster site are able to quickly identify the wearer as having one or more of the abilities of the wearer (firefighter, paramedic, HAZMAT responder).

As described thus far, the garment 402 is able to change its visual appearance based on the current role of the wearer, thus making the wearer (and his/her role/abilities) visually apparent to those at the disaster site. In an embodiment of the present invention, this visibility is further adjusted according to the environment of the disaster site. For example, if the disaster site is a mountain side in which an avalanche has occurred, making the garment 402 white would not make it highly visible. Similarly, if the disaster site is a coal mine disaster site, making the garment 402 black would not make it highly visible. Similarly, if the disaster site is a room in which the walls and floor have been painted red, making the garment 402 red would not make it highly visible. Thus, in this embodiment an environmental dominant hue sensor 410 detects a dominant hue of an environment in which the wearer is located.

Exemplary environmental dominant hue sensor 410 is a light sensor that is able to receive projected and/or reflected light and to differentiate different hues (colors). For example, environmental dominant hue sensor 410 may contain a first light sensor that is sensitive to red light, a second light sensor that is sensitive to blue light, and a third light sensor that is sensitive to green light. By combining the readings/outputs from these three light sensors, the environmental dominant hue sensor 410 is able to determine the dominant (i.e., most widespread) color of the environment of the disaster site.

Outputs from the environmental dominant hue sensor 410, which are based on this environmental hue information, are input into the hardware controller 406, which then further adjusts the dynamically modifiable display 404 based on the dominant hue of the environment in which the wearer is located. For example, if the environment is that of an avalanche disaster site, then the hardware controller 406 will darken the appearance of the dynamically modifiable display 404. Similarly, if the environment is that of a coal mining disaster site, then the hardware controller 406 will lighten the appearance of the dynamically modifiable display 404. Similarly, if the disaster site (environment) is that of a room in which the floors/wall/ceiling are painted red, then the hardware controller 406 will avoid the use of red when configuring the appearance of the dynamically modifiable display 404.

In an embodiment of the present invention, the garment 402 includes and/or has access to a biometric sensor 412. Examples of biometric sensor 412 include, but are not limited to, a blood pressure/pulse monitor (e.g., a pressure/sound sensor that detects the pulse and/or blood pressure of the holder of an electronic device such as a smart phone), a skin sensor (e.g., a resistance sensor that measures a galvanic skin response from the user/holder sweating while holding an electronic device such as a smart phone), a microphone (e.g., to detect a breathing pattern of the holder of an electronic device such as a smart phone), etc. Thus, biometric sensor 412 is an electronic device for gathering biometric data associated with a human. Biometric data is data describing a physiological state, physical attribute, or measurement of a physiological condition of a person.

The biometric sensor 412 generates an indication of a real-time biometric state of the wearer of the garment 402. Based on this real-time biometric state of the wearer of the garment 402, the hardware controller 406 further adjusts the dynamically modifiable display 404.

For example, assume that the wearer of the garment 402 is a paramedic with 10 years of experience (as indicated by data that has been loaded into the data memory 409). Assume further that the biometric sensor 412 indicates that the heartrate, respiratory rate, and/or blood pressure of the wearer of the garment 402 is elevated to a level that has been predefined as being indicative of high-anxiety for a paramedic with 10 years of experience. That is, such elevated biometric readings may be normal for a novice paramedic or a mere observer of the disaster, but are indicative of an emergency state (e.g., in need of medical assistance for the wearer of the garment 402, in need of assistance in helping other victims at the disaster site, in need of resources such as medical supplies, etc.) for an experienced paramedic. Thus, based on 1) the role of the wearer of the garment 402 and 2) readings from the biometric sensor 412, the visual appearance of the dynamically modifiable display 404 (and thus the garment 402) can be selectively changed/modified.

In another example, the role of the wearer combined with the biometric readings may cause the dynamically modifiable display 404 to start flashing a blinking red cross or other recognizable symbol, indicating that the wearer of the garment 402 is a paramedic who needs help transporting and/or treating a victim at the disaster site due to his/her biometric state. That is, the blinking red cross not only identifies the role of the wearer (paramedic), but also indicates that he/she is physically or emotionally compromised, thus in need of immediate assistance.

In one embodiment of the present invention, the garment 402 includes a positioning hardware system 414, such as a Global Positioning System (GPS) device that uses space-based satellites that provide geophysical coordinate information to a GPS receiver. Thus, the positioning hardware system 414 determines a real-time location of the wearer of the garment 402.

Knowing where the wearer of the garment 402 is in real-time provides information that may be used in various manners. For example, assume that managing server 426 is used by a Command and Control (C&C) supervisor at a disaster site. Information from the positioning hardware system 414 allows this C&C supervisor to know where all emergency responders under his/her command are located within a disaster site at any point in time.

In one or more embodiments, information generated by the positioning hardware system 414 provides information needed to present additional information about the real-time contextual state of the real-time location of the wearer of the garment 402 from a news provider server 428, thus enabling the hardware controller 406 to further adjust the dynamically modifiable display 404 based on the real-time location of the wearer of the garment. That is, the positioning hardware system 414 lets the communication link 416 and/or hardware controller 406 know where the garment 402 is currently located (e.g., the disaster site), thus allowing the communication link 416 to interrogate the news provider server 428 for real-time information about the disaster site.

Examples of news provider server 428 include, but are not limited to a social media service server, a news reporting broadcaster server, a crowdsourcing server, etc.

For example, assume that news provider server 428 is a social media service server, which connects members of a social media community. An exemplary social media service allows persons to post messages with metadata that describe a topic. For example, metadata in the form of a hashtag followed by the topic (e.g., #Disaster) can be monitored by a communication link 416 (e.g., a cellular link, which includes data processing abilities, to the news provider server 428). Postings with the metadata #Disaster can be monitored by and processed by the communication link 416, thus generating a flag/message that the disaster site is experiencing a release of toxic gas. This information is then conveyed to hardware controller 406, which adjusts the appearance of the dynamically modifiable display 404 accordingly. In the example of the multi-capable wearer (firefighter, paramedic, HAZMAT responder), the visual appearance of the dynamically modifiable display 404 would change to that which visually indicates that the wearer is a qualified HAZMAT responder, thus making him/her available to respond to the gas leak being reported by the news provider server 428.

When acting in the role of a news reporting broadcaster server, the news provider server 428 is a server that broadcasts (e.g., via a cellular network) information from a professional news reporting service (e.g., a local radio station) to the garment 402 via the communication link 416 (e.g., a radio receiver), thus enabling the hardware controller 406 to adjust the appearance of the dynamically modifiable display 404 accordingly.

While the appearance of the dynamically modifiable display 404 has been described thus far as presenting a singular color/shape according to a single current role of the wearer of the garment 402, in one embodiment of the present invention, the dynamically modifiable display 404 is able to simultaneously display multiple colors/shapes that correspond to multiple roles of the wearer of the garment 402. For example, the dynamically modifiable display 404 may simultaneously display orange indicating that the wearer is a firefighter, red indicating that the wearer is also a paramedic, and blue indicating that the wearer is also a HAZMAT responder.

In one embodiment of the present invention, the colors/shapes being displayed on the dynamically modifiable display 404 not only identify the multiple roles that the wearer can assume, but also the level of expertise in each role. For example, continuing with the example in which orange indicates that the wearer of the garment 402 is a firefighter, red indicates that the wearer is also a paramedic, and blue indicates that the wearer is also a HAZMAT responder, assume that the wearer of the garment 402 has been a firefighter for 10 years, a paramedic for 10 years, but a qualified HAZMAT responder for only a month, as indicated by data stored in a database storage device 418 (and/or the data memory 409) that is within and/or accessible to garment 402. As such, a display area of the dynamically modifiable display 404 may be 45% orange (indicating a high level of expertise in firefighting), 45% red (indicating a high level of expertise in emergency medicine), but only 10% blue (indicating only limited ability in handling HAZMAT emergencies). In one embodiment, these different amounts of color are displayed in a bar graph on the dynamically modifiable display 404, thus making it easier to see the different levels of expertise held by the wearer of the garment 402.

In one embodiment of the present invention, the garment 420 includes a prosody analyzer 420, which analyzes vocal patterns of the wearer to determine a current emotional state of the wearer. That is, a microphone (not shown) within the prosody analyzer 420 captures not only vocalizations that are coherent (verbal) speech, but also non-verbal sounds such as breath sounds, grunts, and other types of vocalizations of the wearer of the garment 402. The prosody analyzer 420 analyzes these vocalizations to determine the current state of the wearer of the garment 402. For example, a rasping sound may indicate that the wearer has a punctured lung (such that the current state of the wearer is a medical state condition). A high-pitched rapid vocal pattern may indicate that the wearer of the garment 402 is panicking (such that the current state of the wearer is an emotional state condition). A grunt may indicate that the wearer of the garment 402 is strenuously exerting (such that the current state of the wearer is a workload state condition).

Based on the current state of the wearer of the garment 402 as determined by the prosody analyzer 420, the hardware controller 406 is able to further adjust/modify the appearance of the dynamically modifiable display 404. For example, if the wearer has a punctured lung (as indicated by the rasping sound detected by the prosody analyzer 420), then the dynamically modifiable display 404 may change to a rapidly blinking red light, indicating the need for immediate medical attention. Similarly, if the wearer is panicking (as indicated by the high-pitched vocal pattern detected by the prosody analyzer 420), then the dynamically modifiable display 404 may turn black, indicating that the wearer is no longer available to work the disaster site. Similarly, if the wearer is strenuously exerting himself physically (as indicated by the grunting sound detected by the prosody analyzer 420), then the dynamically modifiable display 404 may turn to a slow-blinking yellow light, indicating the need for assistance from another person or a mechanical lifting device (e.g., to move rubble from an earthquake site).

While the prosody analyzer 420 may be able to automatically determine what resource(s) are needed by the wearer of the garment 402, in one embodiment this determination is made by a resource needs determination device 422, which identifies a current resource need of the wearer of the garment 402 based on an input to the resource needs determination device from the wearer of the garment and/or on the real-time role of the wearer of the garment 402.

That is, the wearer of the garment 402 may simply push a button, flip a switch, speak into a microphone, etc. that is associated with the resource needs determination device 422, thus providing an input indicating what resource is needed (i.e., another person, a tool, etc.). This input is then provided to the hardware controller 406, which alters the appearance of the dynamically modifiable display 404 (e.g., a flashing yellow appearance of the dynamically modifiable display 404 may indicate the need for a backhoe to move rubble from a building).

In one embodiment of the present invention, the appearance of the dynamically modifiable display 404 is dependent not only on the input to the resource needs determination device 422 provided by the wearer of the garment 402, but also on the role of that wearer (as identified by data within the database storage device 418 and/or data memory 409). For example, if the role of the wearer of the garment 402 is that of a paramedic, and the wearer of the garment 402 inputs a signal to the resource needs determination device 422 that he/she needs backup assistance, then a flashing red cross may be displayed on the dynamically modifiable display 404, indicating that he/she needs another paramedic to assist him/her. However, if the role of the wearer of the garment 402 is that of a firefighter, and the wearer of the garment 402 inputs a signal to the resource needs determination device 422 that he/she needs backup assistance, then a flashing orange triangle may be displayed on the dynamically modifiable display 404, indicating that he/she needs another firefighter to assist him/her.

In one embodiment of the present invention, the garment 402 includes an inter-garment communication device 424, which communicates with other garments 430 within a predefined area to create an Internet of Things that is able to identify roles and locations of garment wearers equipped with inter-garment communication devices.

For example, assume that a disaster site is populated with multiple responders, each of which is wearing a version of the garment 402 described herein (either as the depicted garment 402 or the other garments 430 shown in FIG. 4). By communicating among themselves, garment 402 and other garment(s) 430 are able to provide information to the wearers of the garments/other garments 402/430, either directly or via the managing server 426, about the current state of the disaster site. For example, assume that the garment/garments 402/430 are equipped with an environment sensor 427, which is able to detect chemicals (i.e., a toxin or other chemical detector), biologicals (i.e., a sensor that is able to detect certain viruses/bacteria), sound (i.e., a noise dosimeter), and/or other states of the disaster site. This information can then be used to direct the wearers of the garment/garments 402/430 towards or away from certain "hot spots" of chemicals, noise, etc.

Figure 5:
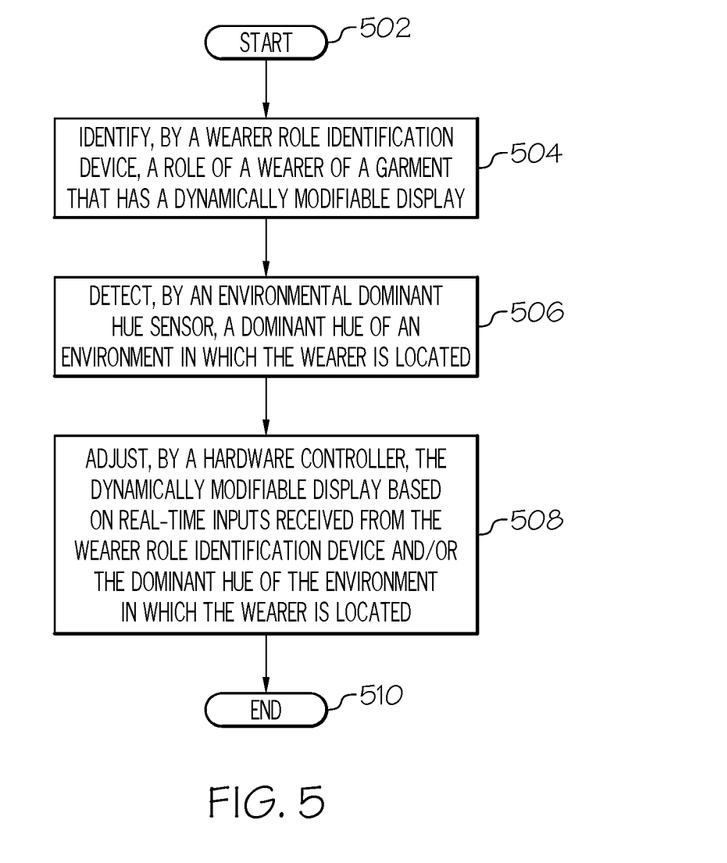
FIG. 5 is a high level flow-chart of one or more operations performed by one or more processors or other hardware devices to adjust a visual appearance of a garment.

With reference now to FIG. 5, a high level flow-chart of one or more operations performed by one or more processors or other hardware devices to adjust a visual appearance of a garment is presented.

After initiator block 502, a wearer role identification device (e.g., wearer role identification device 408 shown in FIG. 2) identifies a role of a wearer of a garment (e.g., garment 402 shown in FIG. 2), as described in block 504. As described herein, the role of the wearer is dynamically changeable, and the garment includes a dynamically modifiable display.

As depicted in block 506, in one embodiment an environmental dominant hue sensor (e.g., environmental dominant hue sensor 410 shown in FIG. 4) also detects a dominant hue of an environment in which the wearer is located.

As depicted in block 508 in FIG. 5, a hardware controller (e.g., hardware controller 406 shown in FIG. 4) adjusts the dynamically modifiable display based on real-time inputs received from the wearer role identification device and/or the environmental dominant hue sensor 410.

The flow-chart shown in FIG. 5 ends at terminator block 510.

In one embodiment of the present invention, the biometric sensor generates an indication of a real-time biometric state of the wearer of the garment, and the hardware controller further adjusts the dynamically modifiable display based on just the real-time biometric state of the wearer of the garment.

In one embodiment of the present invention, a biometric sensor (e.g., biometric sensor 412 shown in FIG. 4) generates an indication of a real-time biometric state of the wearer of the garment. The hardware controller further adjusts the dynamically modifiable display based on real-time inputs received from the biometric sensor and the wearer role identification device, as described herein.

That is, in one embodiment, the appearance of the dynamically modifiable display is further adjusted based just on the biometric state of the wearer, while in another embodiment the appearance of the dynamically modifiable display is further adjusted based on both the biometric readings when applied to a specific role. That is, in one embodiment, the dynamically modifiable display is adjusted according to the biometric readings, regardless of for whom (or for what role) the readings were taken. In another embodiment, the dynamically modifiable display is adjusted according to the biometric readings, depending on the person/role for whom/which the readings were taken.

In one embodiment of the present invention, a positioning hardware system receives a real-time location of the wearer of the garment. A news provider (e.g., a news reporting enterprise, a social media community, etc.) provides a real-time contextual state of the real-time location of the wearer of the garment. The hardware controller then further adjusts the dynamically modifiable display based on the real-time location of the wearer of the garment. That is, the dynamically modifiable display is adjusted solely based on the environment, regardless of the role of the person wearing the garment 402.

In one embodiment of the present invention, a positioning hardware system provides a real-time location of the wearer of the garment, and a news provider provides a real-time contextual state of the real-time location of the wearer of the garment. In this embodiment, the hardware controller further adjusts the dynamically modifiable display based on the real-time location of the wearer of the garment and a role of the wearer of the garment while within the real-time location, where the role of the wearer of the garment while within the real-time location depends on a current state of the real-time location. Thus, in this embodiment, the dynamically modifiable display is adjusted based on not only the environment, but also what the role of the wearer is while within that environment. Thus, the environment defines the role of the wearer.

For example, while at a fire, the role of the wearer of the garment 402 may be that of a firefighter, while at a chemical spill, the role of the same wearer of the garment 402 may be that of a HAZMAT responder. That is, the environment defines the roles of the wearer of the garment 402, which controls the appearance of the garment 402 (e.g., orange for firefighter and blue for a HAZMAT responder).

In one embodiment of the present invention, the hardware controller retrieves, from a database storage device, multiple real-time roles of the wearer of the garment, and then dynamically adjusts the dynamically modifiable display to present visual images that simultaneously represent the multiple roles, as described herein.

In one embodiment of the present invention, a prosody analyzer analyzes vocal patterns of the wearer to determine a current state of the wearer, and the hardware controller further adjusts the dynamically modifiable display based on the current state of the wearer of the garment, as described herein.

In one embodiment of the present invention, the hardware controller retrieves, from a database storage device (e.g., database storage device 418 shown in FIG. 4), a real-time role of the wearer of the garment. A resource needs determination device (e.g., resource needs determination device 422 shown in FIG. 4) determines a current resource need of the wearer of the garment based on an input to the resource needs determination device from the wearer of the garment and on the real-time role of the wearer of the garment. The hardware controller then further adjusts the dynamically modifiable display based on the current resource need of the wearer and the real-time role of the wearer of the garment. That is, based on what the wearer indicates he needs, as well as the wearer's role, the hardware controller will further modify the appearance of the garment/dynamically modifiable display.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A system comprising:
   a hardware controller for adjusting a dynamically modifiable display on a garment; and
   an environmental dominant hue sensor that detects a real-time dominant hue of an environment in which the garment is located, wherein the hardware controller adjusts the dynamically modifiable display based on a real-time detected dominant hue of the environment in which the garment is located in order to increase a color contrast between the dynamically modifiable display and the real-time detected dominant hue of the environment in which the garment is located.

2. The system of claim 1, wherein the hardware controller further adjusts the dynamically modifiable display based on a role of the wearer changing from a first role to a second role, wherein the hardware controller adjusts an appearance of the dynamically modifiable display to depict the second role in response to the role of the wearer changing from the first role to the second role, and wherein the system further comprises:
   a wearer role identification device that identifies the role of a wearer of a garment wherein the role of the wearer defines abilities of the wearer, and wherein the garment comprises a dynamically modifiable display; and
   a database storage device that contains a real-time role of the wearer of the garment, wherein the wearer role identification device retrieves the real-time role of the wearer of the garment as a real-time input to the hardware controller for adjusting the dynamically modifiable display, wherein the wearer of the garment holds multiple roles, and wherein the dynamically modifiable display presents visual images that simultaneously represent the multiple roles.

3. The system of claim 1, further comprising:
   a biometric sensor, wherein the biometric sensor generates an indication of a real-time biometric state of a wearer of the garment, and wherein the hardware controller further adjusts the dynamically modifiable display based on the real-time biometric state of the wearer of the garment.

4. The system of claim 1, further comprising:
a positioning hardware system, wherein the positioning hardware system determines a real-time location of a wearer of the garment; and
a communication link to a news provider server associated with a news provider, wherein the news provider provides a real-time contextual state of the real-time location of the wearer of the garment, and wherein the hardware controller further adjusts the dynamically modifiable display based on the real-time location of the wearer of the garment.

5. The system of claim 1, further comprising:
a positioning hardware system, wherein the positioning hardware system determines a real-time location of a wearer of the garment; and
a communication link to a news provider, wherein the news provider provides a real-time contextual state of the real-time location of the wearer of the garment, and wherein the hardware controller further adjusts the dynamically modifiable display based on the real-time contextual state of the real-time location of the wearer of the garment and a role of the wearer of the garment while within the real-time location, wherein the role of the wearer of the garment while within the real-time location depends on the real-time contextual state of the real-time location.

6. The system of claim 1, further comprising:
a prosody analyzer, wherein the prosody analyzer analyzes vocal patterns of a wearer of the garment to determine a current state of the wearer of the garment, and wherein the hardware controller further adjust the dynamically modifiable display based on the current state of the wearer of the garment.

7. The system of claim 1, further comprising:
a database storage device that contains a real-time role of a wearer of the garment; and
a resource needs determination device, wherein the resource needs determination device identifies a current resource need of the wearer of the garment based on an input to the resource needs determination device from the wearer of the garment and on the real-time role of the wearer of the garment, wherein the hardware controller further adjusts the dynamically modifiable display based on the current resource need of the wearer.

8. The system of claim 1, further comprising:
an inter-garment communication device, wherein the inter-garment communication device communicates with other garments within a predefined area to create an Internet of Things that is able to identify roles and locations of garment wearers equipped with inter-garment communication devices.

9. A method for adjusting a visual appearance of a garment, the method comprising:
detecting, by an environmental dominant hue sensor, a real-time dominant hue of an environment in which a garment is located; and
adjusting, by a hardware controller, a dynamically modifiable display on the garment based on the dominant hue of the environment in which the garment is located, wherein the hardware controller adjusts the dynamically modifiable display based on a real-time detected dominant hue of the environment in which the garment is located in order to increase a color contrast between the dynamically modifiable display and the real-time detected dominant hue of the environment in which the garment is located.

10. The method of claim 9, further comprising:
identifying, by a wearer role identification device, a role of a wearer of a garment, wherein the role of the wearer is dynamically changeable, wherein the role of the wearer defines abilities of the wearer, and wherein the garment comprises the dynamically modifiable display; and
further adjusting, by the hardware controller, the dynamically modifiable display based on real-time inputs received from the wearer role identification device, wherein the real-time inputs describe the role of the wearer changing from a first role to a second role, and wherein the hardware controller adjusts an appearance of the dynamically modifiable display to depict the second role in response to the role of the wearer changing from the first role to the second role.

11. The method of claim 9, further comprising:
identifying, by a wearer role identification device, a role of a wearer of the garment, wherein the role of the wearer defines abilities of the wearer;
generating, by a biometric sensor, an indication of a real-time biometric state of the wearer of the garment; and
further adjusting, by the hardware controller, the dynamically modifiable display based on real-time inputs received from the biometric sensor and the wearer role identification device.

12. The method of claim 9, further comprising:
receiving, from a positioning hardware system, a real-time location of a wearer of the garment;
receiving, from a news provider, a real-time contextual state of the real-time location of the wearer of the garment; and
further adjusting, by the hardware controller, the dynamically modifiable display based on the real-time contextual state of the real-time location of the wearer of the garment.

13. The method of claim 9, further comprising:
receiving, from a positioning hardware system, a real-time location of a wearer of the garment; and
receiving, from a news provider, a real-time contextual state of the real-time location of the wearer of the garment, wherein the hardware controller further adjusts the dynamically modifiable display based on the real-time location of the wearer of the garment and a role of the wearer of the garment while within the real-time location, wherein the role of the wearer of the garment while within the real-time location depends on a current state of the real-time location.

14. The method of claim 9, further comprising:
retrieving, by the hardware controller and from a database storage device, multiple real-time roles of a wearer of the garment; and
dynamically adjusting, by the hardware controller, the dynamically modifiable display to present visual images that simultaneously represent the multiple roles.

15. The method of claim 9, further comprising:
analyzing, by a prosody analyzer, vocal patterns of a wearer of the garment to determine a current state of the wearer of the garment; and
further adjusting, by the hardware controller, the dynamically modifiable display based on the current state of the wearer of the garment.

16. The method of claim 9, further comprising:
retrieving, by the hardware controller and from a database storage device, a real-time role of a wearer of the garment;

identifying, by a resource needs determination device, a current resource need of the wearer of the garment based on an input to the resource needs determination device from the wearer of the garment and on the real-time role of the wearer of the garment; and further adjusting, by the hardware controller, the dynamically modifiable display based on the current resource need of the wearer and the real-time role of the wearer of the garment.

17. A computer program product for adjusting a dynamically modifiable display on a garment, the computer program product comprising a non-transitory computer readable storage medium having program code embodied therewith, wherein the non-transitory computer readable storage medium is a tangible medium, and wherein the program code is readable and executable by a processor to perform a method comprising:

detecting, by an environmental dominant hue sensor, a real-time dominant hue of an environment in which a garment is located; and adjusting, by a hardware controller, a dynamically modifiable display on the garment based on the dominant hue of the environment in which the garment is located, wherein the hardware controller adjusts the dynamically modifiable display based on a real-time detected dominant hue of the environment in which the garment is located in order to increase a color contrast between the dynamically modifiable display and the real-time detected dominant hue of the environment in which the garment is located.

18. The computer program product of claim 17, wherein the method further comprises:

identifying, by a wearer role identification device, a role of a wearer of a garment, wherein the role of the wearer is dynamically changeable, wherein the role of the wearer defines abilities of the wearer, and wherein the garment comprises the dynamically modifiable display; and further adjusting, by the hardware controller, the dynamically modifiable display based on real-time inputs received from the wearer role identification device, wherein the real-time inputs describe the role of the wearer changing from a first role to a second role, and wherein the hardware controller adjusts an appearance of the dynamically modifiable display to depict the second role in response to the role of the wearer changing from the first role to the second role.

19. The computer program product of claim 17, wherein the method further comprises:

identifying, by a wearer role identification device, a role of a wearer of the garment, wherein the role of the wearer defines abilities of the wearer;

generating, based on readings from a biometric sensor, an indication of a real-time biometric state of the wearer of the garment; and further adjusting, by a hardware controller, the dynamically modifiable display based on real-time inputs received from the biometric sensor and the wearer role identification device.

20. The computer program product of claim 17, wherein the method further comprises:

receiving, from a positioning hardware system, a real-time location of a wearer of the garment;

receiving, from a news provider, a real-time contextual state of the real-time location of the wearer of the garment; and further adjusting, by the hardware controller, the dynamically modifiable display based on the real-time contextual state of the real-time location of the wearer of the garment.

* * * * *